April 28, 1936.   J. D. SARTAKOFF   2,038,959
POWER TRANSMISSION DEVICE
Filed July 1, 1935   6 Sheets-Sheet 1

INVENTOR.
Jack D. Sartakoff
BY
ATTORNEY.

April 28, 1936.  J. D. SARTAKOFF  2,038,959
POWER TRANSMISSION DEVICE
Filed July 1, 1935   6 Sheets-Sheet 4

INVENTOR.
Jack D. Sartakoff
BY
ATTORNEY.

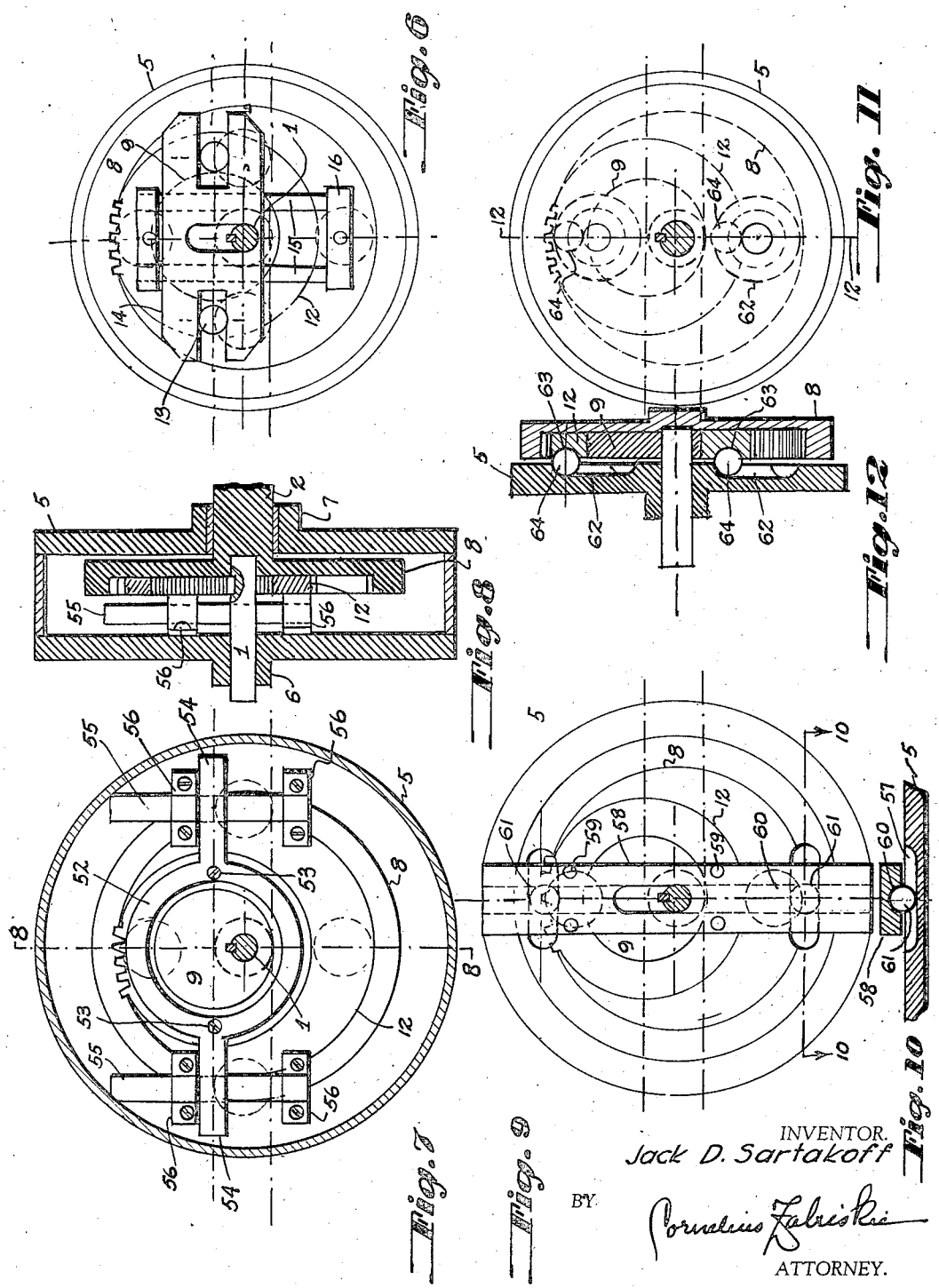

April 28, 1936.   J. D. SARTAKOFF   2,038,959
POWER TRANSMISSION DEVICE
Filed July 1, 1935   6 Sheets-Sheet 6

INVENTOR.
Jack D. Sartakoff
BY
Cornelius Zabriskie
ATTORNEY.

Patented Apr. 28, 1936

2,038,959

UNITED STATES PATENT OFFICE 2,038,959

POWER TRANSMISSION DEVICE

Jack D. Sartakoff, Elmhurst, N. Y.

Application July 1, 1935, Serial No. 29,186

19 Claims. (Cl. 74—259)

This invention is a power transmission device intended for the transmission of power in vehicles and machines of all kinds, but particularly intended for employment in connection with motor vehicles.

One object of the invention is to obtain marked simplification in transmission construction to eliminate the necessity of a large number of moving parts which are apt to get out of order or require frequent maintenance.

A further object of the invention is to provide, in a structure of this character, an apparatus which will operate at all speeds with a minimum amount of vibration and which, above certain predetermined speeds, will function as a substantially direct drive under which condition the relatively movable internal parts of the transmission operate as a unit and without relative movement with respect to one another. The advantage of this arrangement is that, during periods of operation above a predetermined speed, there is practically no wear upon the relatively movable operating parts of the transmission, but, in contradistinction, they are all, in effect, locked together to function as a unit.

Another object of the invention is to eliminate in a transmission mechanism all manually operable gear shifting devices heretofore so common in motor vehicle transmissions and to provide a more or less automatic device operable under varying conditions of speed and load to deliver power as it is needed at the speeds required.

Another object of the invention is to provide a transmission mechanism which will obviate the necessity of employing the conventional clutch between the power unit and the transmission, as is now commonly the case.

Another object of the invention is to so balance or counterbalance the respective parts of the structure that there will be no objectionable vibration at any speed.

Another object of the invention is to incorporate in a transmission, a series of properly counterbalanced masses mounted for gyratory movement eccentrically of a power shaft and so operatively connected with respect to the power shaft that the gyratory movement of said masses will be of a constant and unvarying character and velocity for any particular speed, in contradistinction to acceleration and deceleration of such masses which would tend to produce undesirable vibration and noise and undesirable strains on the mechanism.

Another object of the invention is to provide a transmission wherein the speed ratios between the driving and driven shafts may be relatively high and yet the transmission as a whole be smaller than the conventional mechanism of motor cars.

Another object of the invention is to provide a power transmission device utilizing, among other elements, intermeshing gears, at least one of which is eccentrically mounted with respect to the other, and which gears are at all times in mesh, and to so restrain the eccentrically mounted gear that it is normally precluded from simple rotation, but is adapted for gyratory movement about a circular orbit, and to so restrain the eccentrically mounted gear that its movement through said orbit will be at a constant velocity for any particular speed during relative rotation between said gears.

An important feature in the transmission of this invention resides in the fact that it is extremely economical in the use of lubricants, since the relatively movable operating parts are adapted for such relative movement only below predetermined speeds and above these predetermined speeds the parts operate as a unit without relative movement, so that the lubricant in which said parts may work is not constantly in use. Furthermore, the fact that the relatively movable parts operate as a unit above predetermined speeds eliminates power losses above these speeds and insures the delivery of maximum power to the driven shaft.

Another object of the invention is to provide greatly simplified, though thoroughly efficient, means for driving a driven shaft in reverse, as well as in forward direction of rotation, as hereinafter more fully described.

Features of the invention, other than those adverted to, will be apparent from the hereinafter detailed description and claims, when read in conjunction with the accompanying drawings.

The accompanying drawings illustrate different practical embodiments of the invention, but the constructions therein shown, are to be understood as illustrative, only, and not as defining the limits of the invention.

Figure 3:
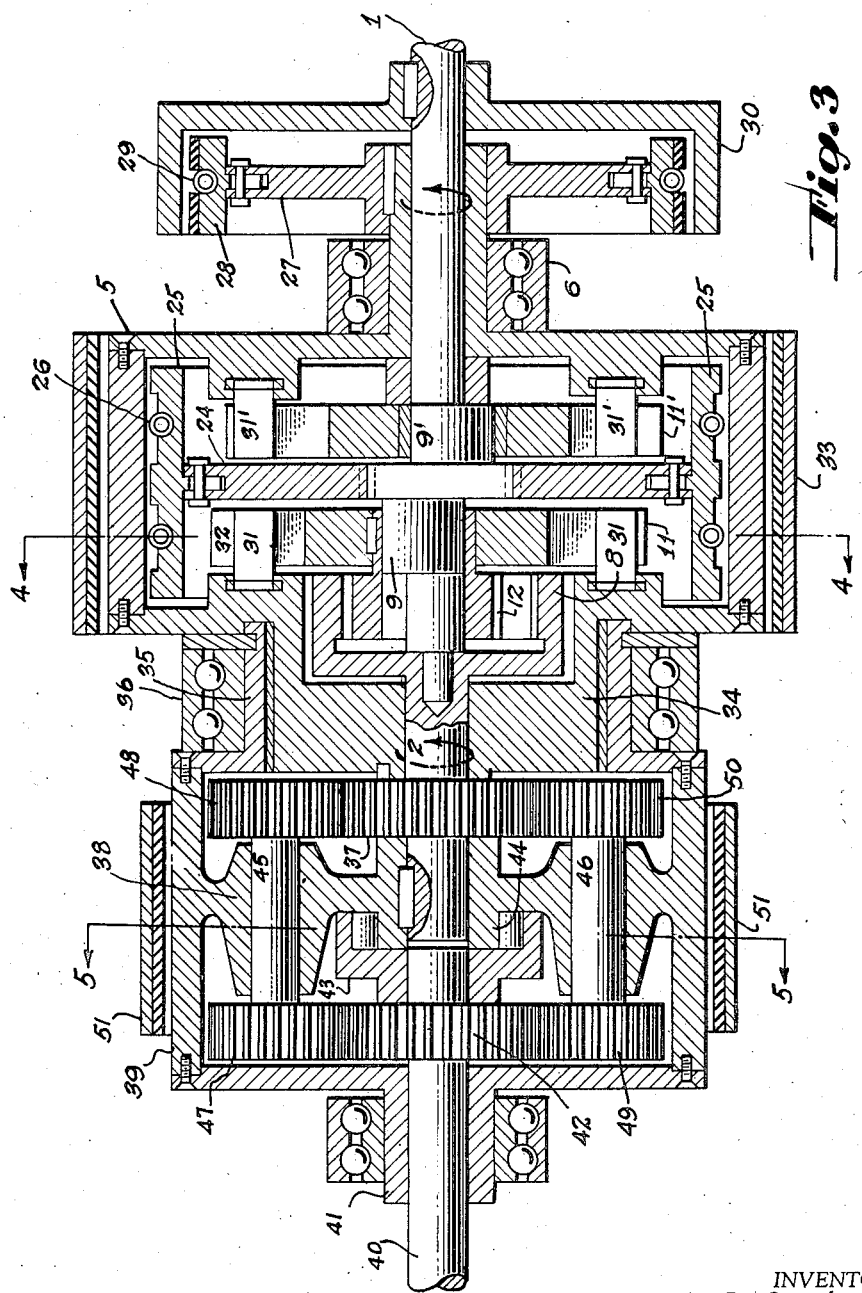
Figure 3 shows a further embodiment of the invention incorporating certain features of Figures 1 and 2 together with additional features. This view shows the greater portion of the transmission mechanism in central longitudinal section with other parts shown in elevation in the interests of clearness.
Figure 4:
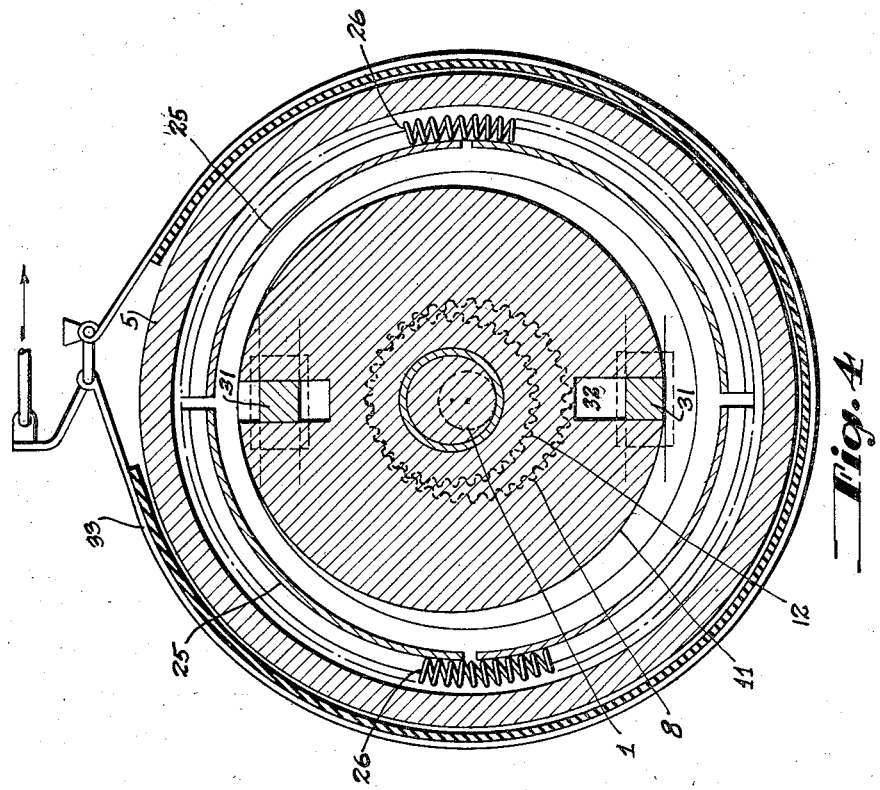
Figure 5:
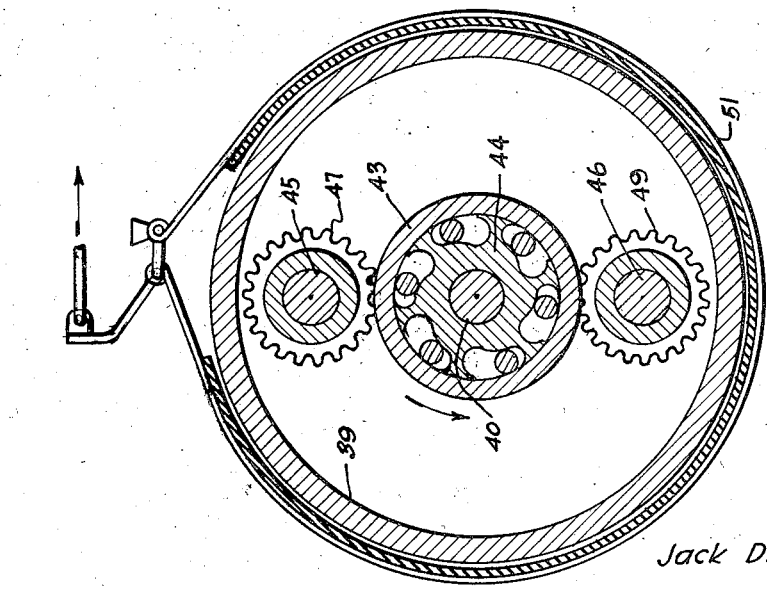

Figures 4 and 5 are transverse sections on the lines 4—4 and 5—5 of Figure 3.

Figures 6, 7, 9 and 11 are face views of certain operating parts of the structure with certain other parts shown in section and illustrating different forms of arresters which I may employ as hereinafter explained.

Figure 8 is a section on the line 8—8 of Figure 7.

Figure 10 is a section on the line 10—10 of Figure 9.

Figure 12 is a section on the line 12—12 of Figure 11.

Figures 13-20 are diagrammatic views graphically illustrating the operation of certain relatively movable primary parts of the transmission of this invention when made in different forms.

Figure 1:
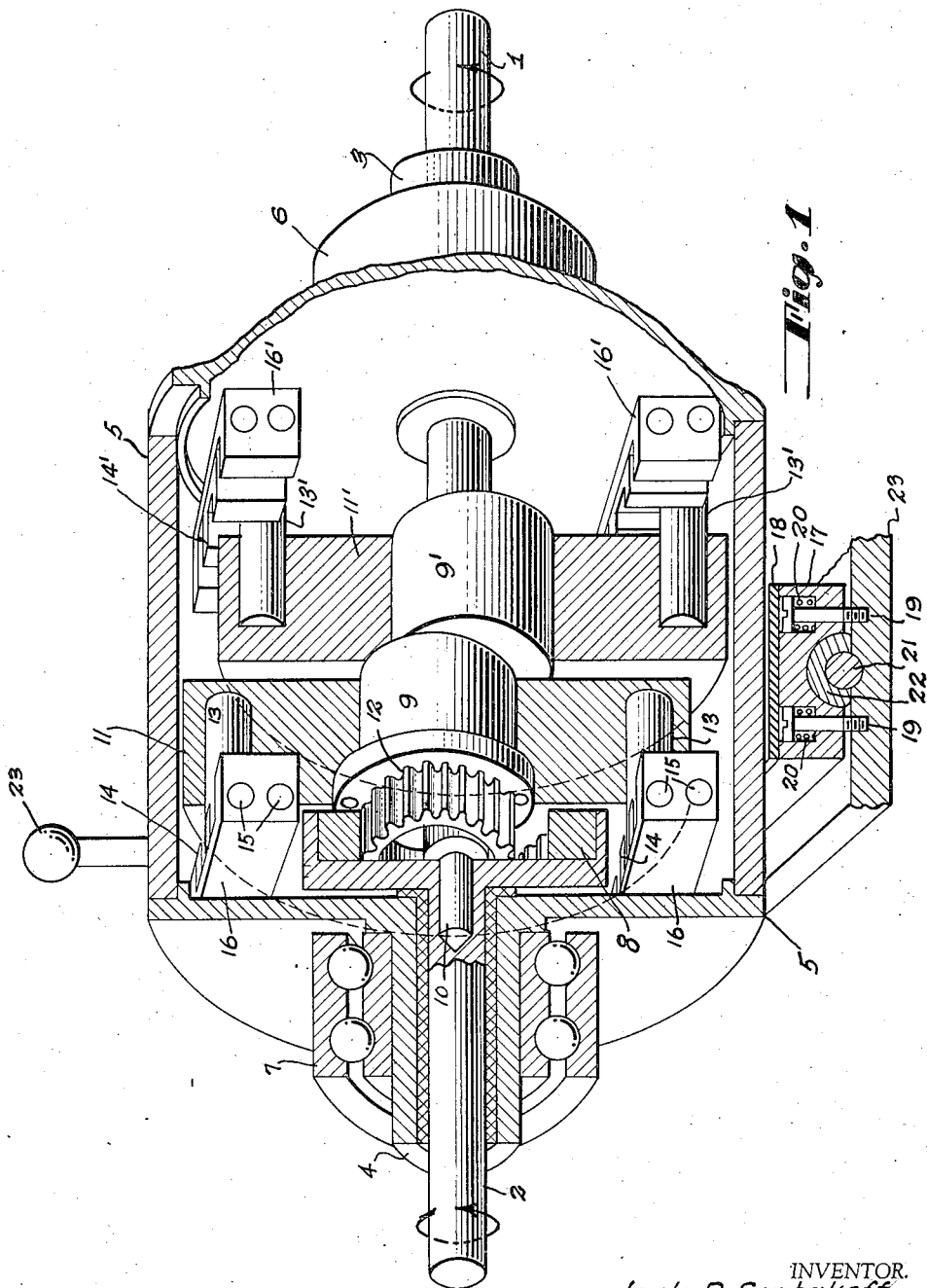
Figure 1 is a section perspective of a transmission mechanism embodying the present invention.

In Figure 1 of the drawings, I have shown a relatively simple form of the invention. In this figure, the reference character 1 indicates the driving shaft, which may be referred to as the power input, and 2 the driven shaft, which constitutes the power outlet. These shafts are arranged in coaxial relation and are mounted for rotation within alined bosses 3 and 4, respectively, mounted on the opposite ends of the transmission housing 5. The transmission housing is preferably circular in contour or at least has a circular portion thereon and the bosses 3 and 4 are provided exteriorly with bearings 6 and 7, mounted in any suitable rigid support, so as to permit not only the driving and driven shafts to rotate within the bosses 3 and 4, but to also allow of rotation of the housing as a whole within the bearings 6 and 7.

Mounted on the inner end of the driven shaft 2 is an internal gear 8, while mounted on the driving shaft 1 is an eccentric portion 9 of cylindrical form. The driving shaft projects beyond the eccentric 9 and is preferably reduced in cross section to find a bearing in the inner end of the driven shaft as shown at 10.

Embracing the eccentric 9 and coaxial therewith and free for rotation thereon, is a cylindrical weight designated by the reference character 11. This weight is of annular form and constitutes a mass and to the side of the weight adjacent the internal gear 8 is fixed an external gear 12 of such diameter as to mesh with the internal gear at one point, due to the eccentricity between these gears.

At diametrically opposite points, the weight 11 carries arrester pins 13, which project beyond the face of the weight and are adapted to operate in radial slots formed in arresters 14. These arresters are in turn supported for movement in directions normal to the slots on guide rods 15 supported by brackets 16 rigidly mounted on the interior of the end walls of the housing.

Inasmuch as the parts referred to are adapted for rotation, gyration and reciprocating movement, according to the operation of particular elements, it is desirable to properly counterbalance these moving parts. Consequently, I preferably add a counterbalancing eccentric 9', a corresponding weight 11', with pins 13' coacting with arresters 14' mounted in brackets 16', the structure of these latter parts being the same as the corresponding parts which they counterbalance, but positioned with their masses at substantially 180 degrees, in order to obtain the proper counterbalancing effect. It will of course be understood that the weight of the gear 12 may be properly counterbalanced by suitable weights associated with the structure, but the same result can be obtained by slightly increasing the weight of the part 11'.

As hereinbefore stated, the housing is mounted for rotation, but means is provided to brake such rotation. This means is shown for the purpose of illustration as a brake 17 provided with a suitable brake lining 18 shaped to and adapted to coact with the cylindrical outer periphery of the housing 5. The brake is anchored against movement by screws 19 to any suitable rigid support 23 and springs 20 serve to normally retract the brake. Associated with said brake, however, is a rod 21 having thereon one or more cams 22 and to one end of which rod is secured a brake lever 23, so that when this brake lever is operated, the cams 22 act against the upper surface of the rigid support 23 and lift the brake into engagement with the housing to frictionally arrest the rotation of the latter.

The operation of the device, as thus far described and as shown in Figure 1, may be explained as follows, and for the purpose of such explanation, it will be assumed that the driving shaft 1 receives power from the crank shaft of an internal combustion engine, as in the case of a motor vehicle, although it will be understood that the invention is not limited to use in this particular environment, but may be utilized for power transmission, generally.

If the vehicle in which the transmission is installed is at rest, with the brake 17 released, the engine may be started in the usual way and will assume an idling speed. Under these conditions, the driving shaft 1, which may be directly connected, and without necessitating the interposition of a conventional clutch, will rotate with the crank shaft of the engine and this rotation will be at a relatively slow or idling speed. As a result, the driving shaft 1 will rotate, causing rotation of the eccentric 9 and its counterbalancing eccentric 9', while the weights 11 and 11' will be gyrated about the axis of the shaft 1. The load on the driven shaft 2, and which load comprises the weight of the car, will cause the shaft 2 to remain stationary, and as a result, the housing 5 will be rotated bodily in a direction contra to the shaft 1, carrying with it the brackets 16 and the arresters 14, with which the pins 13 interfit, so that the several weights will rotate about the eccentrics and with the housing. In fact practically all of the parts will be in motion except the brake mechanism and the driven shaft.

If it is desired to start the vehicle with an application of great force, the brake may now be applied, while sufficient fuel is fed to the engine to cause the same to develop the proper power. When the brake is applied, the rotation of the housing is reduced or stopped. This will immediately preclude the external gear 12 from running idly about the interior of the internal gear 8, and at the same time will arrest rotation of the weight 11. As a result, movement of the weight 11 will be purely a gyratory one about a circular path, but free from rotation about its own axis. Consequently, the external gear 12 will be caused to move in a gyratory path without axial rotation and will impart rotation to the driven shaft. It should be borne in mind in this connection that the diameter of the external gear is less than the diameter of the internal gear and the ratio of speeds between the driving and driven shafts, which will result from this operation will be, assuming the housing 5 to be stationary, as follows, viz:

$$\frac{D-d}{D}$$

(wherein D is the diameter of the internal gear and d the diameter of the external gear). For example, if it be assumed, without in anywise limiting the present invention, that the diameter of the internal gear is 12" and that the diameter of the external gear is 11", the ratio, as computed by the foregoing formula, will equal 1 to 12. Obviously, this relatively high ratio will result in the production of great power as compared to relatively small power at the input.

If, instead of starting or driving under great power in the manner described, through the application of the brake, it is preferred to start the car in a more normal fashion, the use of the brake is not essential as the parts will function automatically in the following way.

When the engine is operating at idling speed, the driving shaft 1, together with the eccentrics, weights, external gear and housing, will be rotated at a corresponding speed. If the engine, however, is now accelerated, so as to increase its speed, the parts of the transmission will rotate at a correspondingly higher speed and this speed will increase as the engine speed is increased, until the centrifugal force, acting upon the weight 11, will become sufficient to preclude simple rotation of the external gear about the interior of the internal gear, and a point will be reached wherein this relative movement between said gears is reduced to a greater and greater extent by such centrifugal force. When this resistance becomes equal to or slightly greater than the load on the driven shaft, the driven shaft will start to turn, and, as the centrifugal force continues to build up, the driven shaft will rotate faster and faster until the speed of the driven shaft very closely approximates the speed of the driving shaft, at which time, there will be relatively little movement between the relatively movable parts of the device.

The structure which has been described may be practically employed as stated and will give satisfactory results. I feel, however, that it is desirable for various practical reasons to so constitute this transmission that, when the speed reaches a predetermined maximum, there will be produced a locking of the parts against rotation, so as to constitute, in effect, a direct drive. This may be accomplished by adding to the driving shaft an automatic clutching device which, when the driving shaft reaches a predetermined speed, will effect a locking engagement between the driving shaft and the housing. Such an arrangement, is shown in an illustrative form in Figure 2 of the drawings.

Referring now to this figure, it will be noted that a disk 24 is fixed on the driving shaft 1 between the two eccentrics 9 and 9' and at the outer peripheral portion of this disk are mounted a plurality of arcuate clutch sections 25. The clutch sections are mounted for radial movement with respect to the disk 24, but are normally maintained free from engagement with the interior cylindrical wall of the housing 5 by any suitable means, such, for example, as a plurality of coil or helical springs 26 which embrace the clutch sections and are held in circumferential channels therein. The tension of these springs is such that, under idling speeds, the clutch sections will be retracted from engagement with the housing, but, after the rotation of the driving shaft 1 has reached a predetermined speed, centrifugal force will act upon said sections 25 and cause them to be thrown outwardly into engagement with the housing to have a clutching action therewith. As these clutch sections 25 engage the housing, they do so with more or less elasticity adapted to provide for sufficient slippage to preclude a too rapid clutching action, but as the speed of the engine increases, and the centrifugal force becomes greater, there will come a point when the clutching action is complete and the parts will be so locked together that the driven shaft will be operated at the same speed as the driving shaft.

Figure 2:
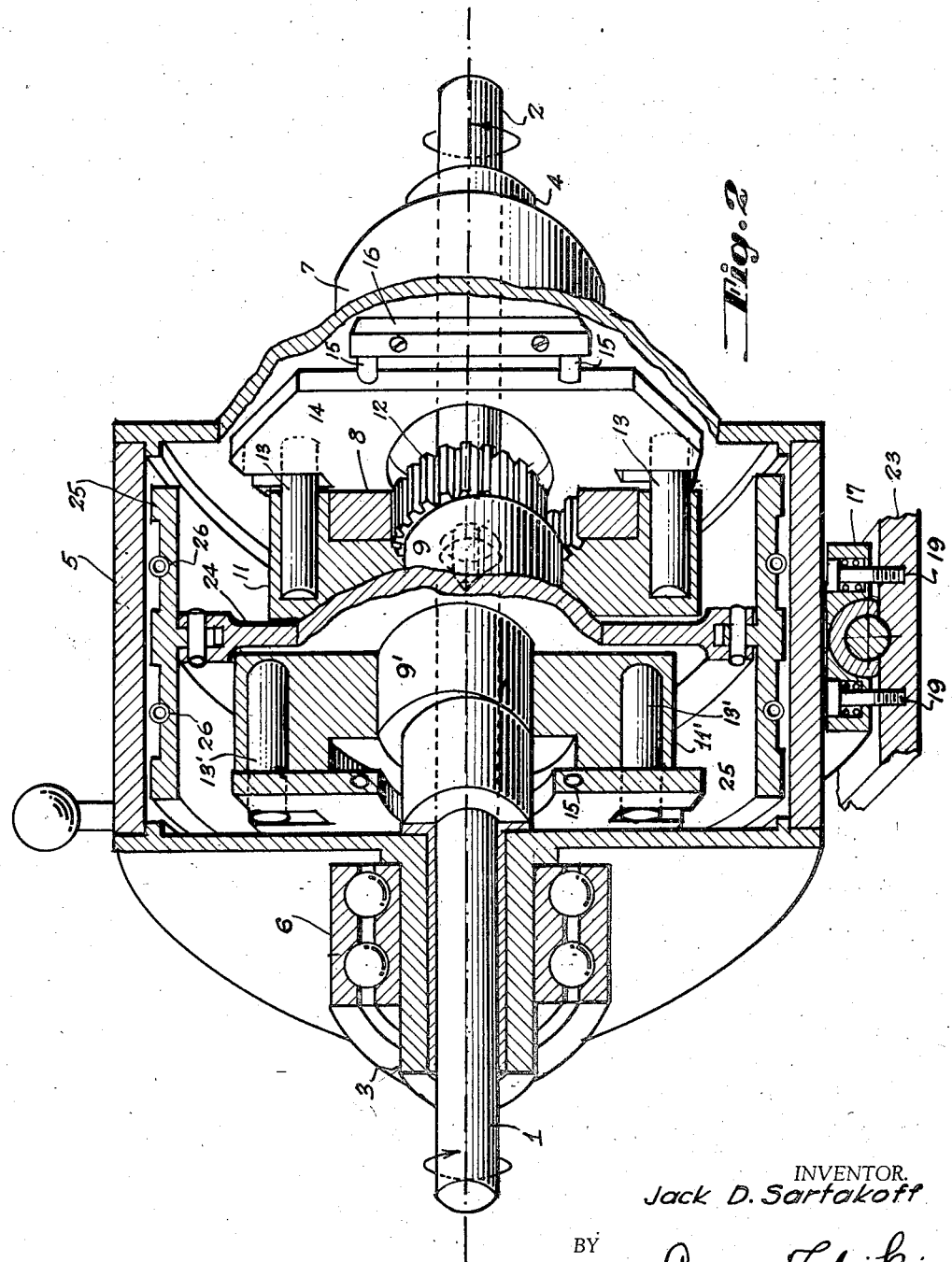
Figure 2 is a similar view showing a modified form of the invention.

It should be understood in this connection that reference to this operation is made with respect to the structure shown in Figure 1, when equipped with the clutching disk and clutching sections, shown in Figure 2, and, when such is the case, and the parts properly clutched, as stated, all the parts of the transmission will rotate about the axis of the shaft without independent individual movement.

The structure of Figure 2 differs in other respects from the arrangement as described in Figure 1, e. g., in the transposition of the external and internal gears. Thus, in Figure 2, the internal gear 8 is mounted concentrically of the weight 11, but eccentrically of the axis of the driving and driven shafts, while the external gear 12 is mounted on the driven shaft and coaxially with the latter. As a result of this transposition of the gears, a somewhat different mode of operation will result during the working of the transmission. That is to say, if the engine is operating at idling speed with the brake 17 off and the vehicle at rest, the driven shaft 2 will be at rest and the housing 5, together with all internal parts, will rotate while the gear 8 simply runs idly about the external gear 12. This condition will continue until the engine is accelerated. As it picks up speed, centrifugal force will act upon the weight 11 to resist, with increasingly greater force, relative rotation between the two gears and, when this resistance overcomes the load on the shaft 2, the vehicle will begin to move. As the speed increases, the centrifugal force will, in due course, become sufficiently great to cause the driven shaft to be rotated at very nearly the same speed as the speed of the driving shaft, but the parts are so arranged that, at about this rate of rotation, the clutching mechanism which I have described will come into operation to actually lock the parts together, so that they will operate as a unit and constitute in effect a direct drive.

The structure of Figure 2 differs somewhat from the structure of Figure 1 in another particular, namely, that if the brake 17 is applied to preclude rotation of the housing, while the engine is idling, the result will be that the driven shaft will be rotated in a reverse direction from the driving shaft. Consequently, if a vehicle is at rest with the engine idling and it is desired to back up the car, it is only necessary to apply the brake in order to accomplish this result. In other words, the mechanism of Figure 2 requires no independent reverse mechanism, other than the mere use of a brake as specified. It will of course be understood in this connection that the brake 17 may be applied in such manner as to slip slightly and thus provide for variable speed in reverse, although the reverse speed may, within reasonable limits, be controlled by the engine speed.

It will be noted from Figure 2 that I have here illustrated a slightly different form of arrester construction. In this showing the upper and lower arresters (as seen in the figure) are formed on a single plate or integral with one another and this single plate is mounted on guide rods 15 supported by brackets 16.

In the practical operation of the mechanism which I have shown in Figures 1 and 2, the transmission housing is preferably charged with an appropriate lubricant, so that all of the operating parts within the housing may operate within the lubricant. As a result, the clutching mechanism, embodying the sections 25 hereinbefore described, will necessarily operate in oil and in some instances, there may be slight slippage during the clutching action. Consequently I may, if desired, position the clutching mechanism exteriorly of the housing entirely or I may use the interior clutching mechanism together with an additional exterior clutching mechanism operating after the manner of a dry clutch, as shown for example in Figure 3 of the drawings. In this latter figure, however, the arrangement of parts is reversed. A disk 27 is rigidly keyed to the hub of the housing 5 and the clutch sections 28, with associated spring 29 are mounted for radial movement on this disk, so as to rotate with the housing. The coacting cylindrical portion 30 of the clutch is keyed to the driving shaft 1.

The operation is very similar to that hereinbefore described, except that the clutching action takes place when the housing has reached a predetermined speed of rotation. This clutch operates dry and will form a substantially positive lock at speeds above the said predetermined speed, so that in the construction of Figure 3, there is, not only the locking of the clutch mechanism described, but the same locking as shown in Figure 2 embodying the disk 24, clutch sections 25 and retracting springs 26. It will be understood that the use of the external clutching action described in connection with Figure 3 might also be used in the structure of Figure 1.

With further reference to Figure 3, it will be apparent that the general method of drive shown in this figure is the same as in Figure 1. That is to say, the driving shaft 1 carries the eccentric 9 having thereon a weight 11 to which is affixed the external gear 12, while the internal gear 8 is fixed on the driven shaft 2. A slight modification, however, is shown in connection with the arrester pins 31 and 31' which correspond to the arrester pins 13 and 13'. In this figure, the arrester pins are mounted on slides for bodily rectilinear movement in one direction within the end walls of the housing and operate in radial slots 32 formed in the weights. The resulting operation, however, is the same, this modification being merely one of structure.

A further modification here illustrated is the use of a strap brake shown at 33 in Figures 3 and 4, in lieu of the type of brake shown in Figures 1 and 2. Otherwise the general structure and mode of operation is substantially the same as shown in Figure 1 and it functions in substantially the same way when incorporated in motor car construction. There is, however, further associated with the transmission of Figure 3, distinct reverse mechanism, so coupled to the driven shaft 2, as to permit the operation of the vehicle in reverse, without reversing the direction of rotation of the engine crank shaft. In order to accomplish this result, a boss 34, which corresponds to the boss 4, is made somewhat larger than in Figures 1 and 2 and has a bearing within a sleeve 35, which, in turn, is embraced by a bearing 36 which supports this part of the transmission from a suitable firm base or other support, to permit both the sleeve 35 and the housing 5 to rotate within the bearing 36, and independently of one another.

Projecting beyond the boss 34 is an integral hub on which is keyed a gear 37 and beyond this gear 37 the web 38 of the reverse housing 39 is also keyed. Mounted in axial alinement with and extending beyond the end of the driven shaft 2 is a tail shaft 40 which, in practice, may lead to the universal joint of the motor vehicle or to any other mechanism to be driven. The forward end of this shaft is freely rotatable in the hub 41 of the reverse housing 39 and carries within said housing a gear 42 corresponding in size to the gear 37. Also fixed on the inner end of the tail shaft 40 is one member 43 of an overrunning clutch, the other member 44 of which clutch is formed in the web of the reverse housing, as shown best in Figure 5. The web 38 also carries stub shafts 45 and 46 to the opposite ends of which are fixed satellite gears 47, 48, 49 and 50. A brake of any suitable form, shown as a strap brake 51, cooperates with the exterior of the reverse housing 39.

The operation of this reverse mechanism is as follows. In the normal operation of the parts for the forward drive, the reverse housing 39, the web 38 of which is keyed to the driven shaft 2, rotates and through the overrunning clutch positively drives the tail shaft 40. The rotation of the reverse housing 39 is incidental in its operation for it is the positive engagement between the 35 clutch parts 43 and 44 which effects the drive. However, when it is desired to reverse the rotation of the shaft 40, the brake 51 is applied. This causes rotation of the housing 39 to cease with the result that the driven shaft 2, to which it is keyed, also stops. However, from the hereinbefore description, it will be apparent that, when the shaft 2 is at rest, the housing 5 must rotate (note prior description of Figure 1) and this rotation is in a backward direction. Consequently, the gear 37, which is keyed to the housing 2, will rotate in a backward direction and will transmit its reverse rotation, through the satellites 48 and 50, through their shafts 45 and 46, respectively, and through the satellites 47 and 49 to the ear 42 which will rotate the tail shaft 40 in a reverse direction. During this operation, the overrunning clutch will operate idly and without transmitting any movement. It should be understood in this connection, however, that the stub shafts 45 and 46 rotate about their individual axes and do not bodily rotate about the axis of the shafts 1, 2 or 40.

In the foregoing figures of the drawings, I have shown different forms of arresters, but it will of course be understood that these are illustrative only and that various other forms might be used within the purview of this invention. Examples of other illustrative forms of arrester are shown in Figures 6–12 inclusive.

The form shown in Figure 6 is the form shown in Figure 2 and needs no further description. It may be noted, however, that in Figure 6, the hole in the center of the arrester for the passage of the shaft 1 is shown as elongated, while in Figure 2, it is shown as circular but this is a matter of choice.

In Figures 7 and 8, the yoke 52 is fixed to the external gear by screws 53 and this yoke has lateral diverging arms 54 which carry oppositely alined guide rods 55 guided by brackets 56 on the end plates of the housing.

In the structure of Figures 9 and 10, the end walls of the housing are interiorly grooved, as shown at 57, and elongated plates 58 are attached by screws 59 to the external gear. The plates are provided with grooves 60 and spherical balls 61 operate in the grooves 57 and 60 as arresters.

In the structure of Figures 11 and 12, the end walls of the housing 5 are provided with circular channels 62, while the external gear is provided with properly juxtaposed semispherical depressions 63 and spherical balls 64 operate in these depressions and channels. It will be apparent from the showing of these figures that the arresters may partake of a wide variety of forms without departing from this invention.

The foregoing detailed description deals with the invention from the standpoint of its structure when embodied in various illustrative practical forms, but the operation of these various forms of mechanism is graphically shown in Figures 13 to 20.

The showing of Figures 13 to 16 corresponds to the structure as illustrated in Figure 1, while the showing of Figures 17–20 relates to the type of structure shown in Figure 2.

Figure 14:
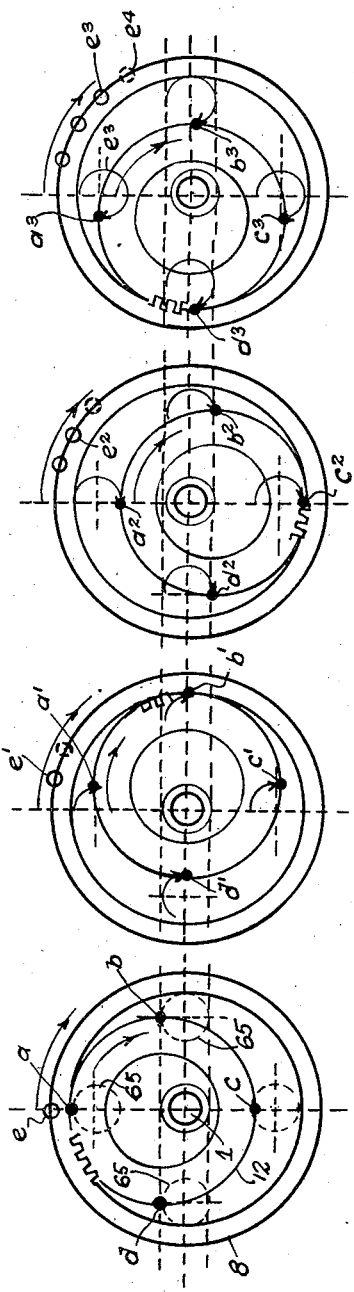
Figure 13:
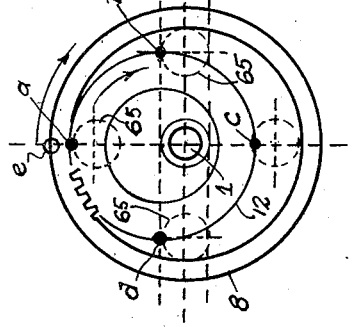
Figure 20:
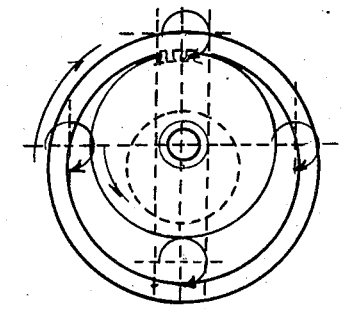
Figure 19:
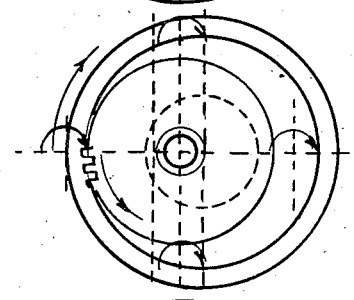
Figure 18:
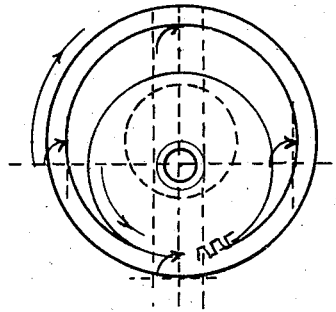
Figure 17:
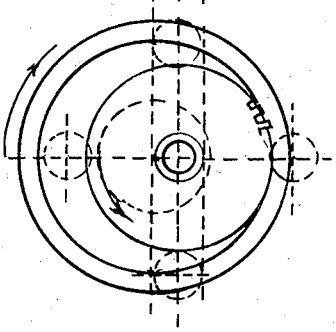

In Figures 13 to 16, the driving shaft 1 carries a relatively fixed eccentric which, in turn, carries a concentric external gear meshing with an internal gear coaxial of and secured to the driven shaft. When the external gear is held against rotation by an arrester, as hereinbefore described, and is thus permitted for gyrating movement only through a definite circular path, it will be apparent that any particular point in the body of the external gear will be caused to travel, during any one complete cycle, in a circular path, the diameter of which will be equal to the eccentricity of such gear. This is graphically shown by the dotted lines 65 in Figure 13. The four dotted cycles shown in this figure indicate the paths traversed by four definite points in the external gear and which points are indicated as *a, b, c* and *d*, shown in Figure 13 at their starting points of the cycle. Figure 14 shows these points *a, b, c* and *d* moved to the positions *a', b', c'* and *d'* during which the external gear has traveled from *e* one increment, indicated at *e'*, of its movement through its gyratory path.

Figure 15:
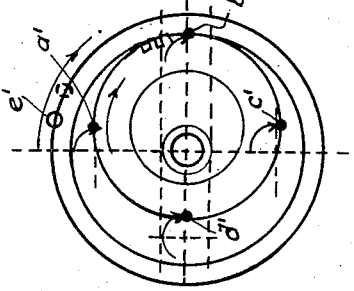

In Figure 15, the points *a, b, c* and *d* have traveled to *a2, b2, c2* and *d2*, while the point *e* has moved through the second increment *e2* of its travel.

Figure 16:
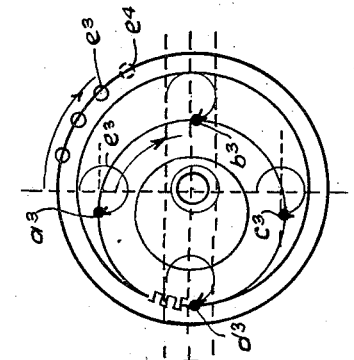

In Figure 16, the points *a, b, c* and *d* have traveled to *a3, b3, c3* and *d3*, while the point *e* has moved through the third increment *e3* of its travel.

During the last quarter of the cycle, the points *a, b, c* and *d* return to their starting positions, while the point *e* proceeds through its next increment, indicated in dotted lines at *e4* in Figure 16.

It will be apparent from these diagrams that the points *a, b, c* and *d* will travel in continuous circular paths at a constant speed, so long as the speed of rotation of the shafts is constant, and that the movement of the point *e* through its several increments in succession will be at a constant velocity and at the predetermined ratio, so that the output at the driven shaft will be at a constant velocity. It is primarily in order to insure this mode of operation that the arresters hereinbefore described, are utilized in order to arrest the movement of the driving gear and thus insure the constant velocities to which I have referred.

The showing of Figures 17 to 20 is illustrative of the same factors as Figures 13 to 16, but show the internal gear as the driving gear eccentrically mounted with respect to the driving shaft.

Having thus fully described the invention, what I claim as new and desire to secure by Letters Patent is:

1. In a power transmission, the combination of a housing, driving and driven members, an eccentric fixed to the driving member, a mass concentrically of and mounted on the eccentric to permit of rotation of the latter relative to the mass, intermeshing internal and external gears, one of which is fixed to the driven member and the other of which is fixed concentrically to the mass and eccentrically of the driving member, and arrester means for securing the mass to the housing to preclude relative rotation between them but to permit bodily gyratory movement of the mass relative to said housing.

2. In a power transmission, the combination of a housing mounted to rotate, driving and driven members journalled for rotation on the housing, an eccentric fixed to the driving member, a mass concentrically of and mounted on the eccentric to permit of rotation of the latter relative to the mass, intermeshing external and internal gears, one of which is fixed to the driven member and the other of which is fixed concentrically to the mass and eccentrically of the driving member, and arrester means for securing the mass to the housing to preclude relative rotation between them but to permit bodily gyratory movement of the mass relative to said housing, and means for restraining rotation of the housing.

3. In a power transmission, the combination of a housing, driving and driven members, an eccentric fixed to the driving member, intermeshing external and internal gears, the internal gear of which is fixed to the driven member and the external gear of which is fixed concentrically to the mass and eccentrically of the driving member, and arrester means for securing the mass to the housing to preclude relative rotation between them but to permit bodily gyratory movement of the mass relative to the housing.

4. In a power transmission, the combination of a housing mounted to rotate, driving and driven members rotatable with respect to one another and to the housing, an eccentric fixed to the driving member, intermeshing internal and external gears, the internal gear of which is fixed to the driven member and the external gear of which is fixed concentrically to the mass and eccentrically of the driven member, arrester means for securing the mass to the housing to preclude relative rotation between them, but to permit of bodily gyratory movement of the mass relative to said housing, and means for restraining rotation of the housing.

5. In a power transmission, the combination of a housing, driving and driven members, an eccentric fixed to the driving member, a mass concentrically of and mounted on the eccentric to permit of rotation of the latter relative to the mass, intermeshing internal and external gears, the external gear of which is fixed to the driven member and the internal gear of which is fixed concentrically to the mass and eccentrically of the driving member, and arrester means for securing the mass to the housing to preclude relative rotation between them, but to permit bodily gyratory movement of the mass relative to said housing.

6. In a power transmission, the combination of a housing mounted to rotate, driving and driven members mounted to rotate independently of one another and the housing, an eccentric fixed to the driving member, a mass concentrically of and mounted on the eccentric to permit of rotation of the latter relative to the mass, intermeshing internal and external gears, the external gear of which is fixed to the driven member and the internal gear of which is fixed concentrically to the mass and eccentrically of the driving member, arrester means for securing the mass to the housing to preclude relative rotation between them, but to permit bodily gyratory movement of the mass relative to the housing, and means for restraining rotation of the housing.

7. In a power transmission, the combination of a housing mounted to rotate on its longitudinal axis, axially alined driving and driven members mounted to rotate with respect to one another and to the housing, an eccentric fixed to the driving member, a mass concentrically of and mounted on the eccentric to permit rotation of the latter within the mass, intermeshing internal and external gears, one of which is fixed coaxially to the driven member and the other of which is fixed concentrically to the mass and eccentrically of the driven member, arrester means for securing the mass to the housing to preclude relative rotation between them but to permit bodily gyratory movement of the mass relative to said housing, and means for restraining rotation of the housing.

8. In a power transmission, the combination of a housing mounted to rotate on its longitudinal axis, axially alined driving and driven members mounted to rotate with respect to one another and to the housing, an eccentric fixed to the driving member, a mass concentrically of and mounted on the eccentric to permit rotation of the latter within the mass, intermeshing internal and external gears, one of which is fixed coaxially to the driven member and the other of which is fixed concentrically to the mass and eccentrically of the driven member, arrester means for securing the mass to the housing to preclude relative rotation between them but to permit bodily gyratory movement of the mass relative to said housing, and centrifugally operable means for clutching the driving member to the housing to insure conjoint rotation between them when said concentrically operable means is operated beyond a predetermined minimum speed.

9. In a power transmission, the combination of a housing mounted to rotate, driving and driven members rotatable with respect to one another and to the housing and at least the driving member of which is concentric to the housing, an eccentric fixed to the driving member, a mass concentrically of and mounted on the eccentric to permit of rotation of the latter within the mass, intermeshing internal and external gears, one of which is fixed to the driven member and the other of which is fixed concentrically to the mass and eccentrically of the driving member, arrester means for securing the mass to the housing to preclude relative rotation between them, but to permit bodily gyratory movement of the mass relative to the housing, and centrifugally operable means interposed between the housing and the driven member and adapted to clutch the housing to the driving member for conjoint rotation when said centrifugally operable means is rotated above a predetermined speed.

10. In a power transmission, the combination of a housing mounted to rotate, driving and driven members rotatable with respect to one another and to the housing and at least the driving member of which is concentric to the housing, an eccentric fixed to the driving member, a mass concentrically of and mounted on the eccentric to permit of rotation of the latter within the mass, intermeshing internal and external gears, one of which is fixed to the driven member and the other of which is fixed concentrically to the mass and eccentrically of the driving member, arrester means for securing the mass to the housing to preclude relative rotation between them, but to permit bodily gyratory movement of the mass relative to the housing, centrifugally operable means interposed between the housing and the driven member and adapted to clutch the housing to the driving member for conjoint rotation when said centrifugally operable means is rotated above a predetermined speed, and means for restraining the housing against rotation.

11. In a power transmission, the combination of a housing, driving and driven members, an eccentric fixed to the driving member, the mass concentrically of and mounted on the eccentric to permit of rotation of the latter relative to the mass, intermeshing external and internal gears, one of which is fixed to the driven member and the other of which is fixed concentrically to the mass and eccentrically of the driving member, and arrester means for securing the mass to the housing to preclude relative rotation between them, but to permit bodily gyratory movement of the mass relative to the housing, said arrester means comprising a plate mounted for rectilinear movement on the housing and having a slot extending in a direction normal to such rectilinear movement, and a projection carried by the mass and projecting into said slot.

12. In a power transmission, the combination of a housing, driving and driven members, an eccentric fixed to the driving member, a mass concentrically of and mounted on the eccentric to permit of rotation of the latter relative to the mass, intermeshing external and internal gears, one of which is fixed to the driven member and the other of which is fixed concentrically to the mass and eccentrically of the driving member, and arrester means for securing the mass to the housing to preclude relative rotation between them, but to permit bodily gyratory movement of the mass relative to the housing, said arrester means comprising a projection mounted on the housing for rectilinear movement in one direction and projecting into a radial slot in the mass, said rectilinear movement of the projection being substantially normal to the slot of the mass when the projection is midway of its path of rectilinear movement.

13. In a power transmission, the combination of a housing, driving and driven members, an eccentric fixed to the driving member, the mass concentrically of and mounted on the eccentric to permit of rotation of the latter relative to the mass, intermeshing external and internal gears, one of which is fixed to the driven member and the other of which is fixed concentrically to the mass and eccentrically of the driving member, and arrester means for securing the mass to the housing to preclude relative rotation between them, but to permit bodily gyratory movement of the mass relative to the housing, said arrester means comprising projections carried by the mass and guided for rectilinear movement by guides on the housing.

14. In a power transmission, the combination of a housing, driving and driven members, an eccentric fixed to the driving member, a mass concentrically of and mounted on the eccentric to permit of rotation of the latter relative to the mass, intermeshing external and internal gears, one of which is fixed to the driven member and the other of which is fixed concentrically to the mass and eccentrically of the driving member, and arrester means for securing the mass to the housing to preclude relative rotation between them, but to permit bodily gyratory movement of the mass relative to the housing, said arrester means comprising opposed depressions formed in the mass and in the housing and a spherical ball housed within said depressions collectively.

15. In a power transmission, the combination of a housing, driving and driven members, an eccentric fixed to the driving member, a mass concentrically of and mounted on the eccentric to permit of rotation of the latter relative to the mass, intermeshing external and internal gears, one of which is fixed to the driven member and the other of which is fixed concentrically to the mass and eccentrically of the driving member, and arrester means for securing the mass to the housing to preclude relative rotation between them, but to permit bodily gyratory movement of the mass relative to the housing, said arrester means comprising opposed depressions formed in the mass and in the housing, and a spherical ball housed within said depressions collectively, one of said depressions being of annular form.

16. In a power transmission, the combination of a housing mounted to rotate, driving and driven shafts, at least the driven shaft of which is coaxial with the housing and is rotatable relative thereto, interconnecting means between the driving and driven shafts and the housing to rotate the driven shaft and the housing selectively in opposite directions, a tail shaft, an overrunning clutch between the driven shaft and the tail shaft and operable to positively drive the tail shaft from the driven shaft when the latter is rotated in one direction, and reversing means interposed between the tail shaft and the housing to drive the tail shaft in a counter direction, with accompanying overrunning of the clutch, when the housing is rotated in a corresponding direction.

17. In a power transmission, the combination of a housing mounted to rotate, driving and driven shafts, at least the driven shaft of which is coaxial with the housing and is rotatable relative thereto, interconnecting means between the driving and driven shafts and the housing to rotate the driven shaft and the housing selectively in opposite directions, a tail shaft, an overrunning clutch between the driven shaft and the tail shaft and operable to positively drive the tail shaft from the driven shaft when the latter is rotated in one direction, and reversing means interposed between the tail shaft and the housing to drive the tail shaft in a counter direction, with accompanying overrunning of the clutch, when the housing is rotated in a corresponding direction, said reversing means comprising a casing mounted for rotation coaxial of the tail and driven shafts, a gear fixed to rotate with the housing, a gear fixed to rotate with the tail shaft and satellite pinions carried by the casing and meshing with the gear of the driven shaft and with the gear of the tail shaft, respectively, and means for restraining rotation of said casing whereby the tail shaft is driven from the housing through the satellite gears with accompanying overrunning of the clutch.

18. In a power transmission, the combination of a housing, driving and driven members, an eccentric fixed to the driving member, a mass concentrically of and mounted on the eccentric to permit of rotation of the latter relative to the mass, intermeshing internal and external gears, one of which is fixed to the driven member and the other of which is fixed concentrically to the mass and eccentrically of the driving member, and arrester means for securing the mass to the housing to preclude relative rotation between them but to permit bodily gyratory movement of the mass relative to said housing, and counterbalancing means for counterbalancing the eccentrically positioned movable parts.

19. In a power transmission, the combination of a housing mounted to rotate upon its longitudinal axis, driving and driven shafts journalled for rotation in the housing, an eccentric fixed on the driving shaft, a mass concentrically of and mounted on the eccentric to permit of rotation of the latter relative to the mass, intermeshing external and internal gears, one of which is fixed to the driven shaft and the other of which is fixed concentrically to the mass and eccentrically of the driving shaft, arrester means for securing the mass to the housing to preclude relative rotation between them but to permit bodily gyratory movement of the mass relative to the housing, means for restraining rotation of the housing, a tail shaft coaxial with the driven shaft, an overrunning clutch interposed between the driven and tail shafts, a casing rotatable coaxially of said latter shafts, a gear fixed to the housing, another gear fixed to the tail shaft, satellite gears carried by the casing and meshing with the gears of the housing and tail shafts, and means for restraining rotation of the casing.

JACK D. SARTAKOFF.